(12) United States Patent
Rottman et al.

(10) Patent No.: US 9,771,035 B2
(45) Date of Patent: Sep. 26, 2017

(54) HARNESS SYSTEM

(71) Applicant: Caterpillar Inc., Peoria, IL (US)

(72) Inventors: Joseph Lee Rottman, Decatur, IL (US); Justin Matthew Krager, Taylorville, IL (US); Bhiku S. Sinai Usgaonker, Decatur, IL (US)

(73) Assignee: Caterpillar Inc., Peoria, IL (US)

( * ) Notice: Subject to any disclaimer, the term of this patent is extended or adjusted under 35 U.S.C. 154(b) by 623 days.

(21) Appl. No.: 14/278,144

(22) Filed: May 15, 2014

(65) Prior Publication Data
US 2015/0329070 A1 Nov. 19, 2015

(51) Int. Cl.
| | | |
|---|---|---|
| *B60R 16/02* | (2006.01) | |
| *F16L 11/12* | (2006.01) | |
| *H02G 3/04* | (2006.01) | |
| *H02G 11/00* | (2006.01) | |
| *B60R 16/08* | (2006.01) | |

(52) U.S. Cl.
CPC .......... *B60R 16/0215* (2013.01); *B60R 16/08* (2013.01); *F16L 11/12* (2013.01); *H02G 3/04* (2013.01); *H02G 11/00* (2013.01)

(58) Field of Classification Search
CPC . B60L 1/00; B60L 1/006; B60R 16/02; B60R 16/0207; B60R 16/0215; E02F 3/76; E02F 3/769; F16L 11/12; H02G 3/00; H02G 3/02; H02G 3/04; H02G 11/00
USPC .......................................... 174/72 A; 307/9.1
See application file for complete search history.

(56) References Cited

U.S. PATENT DOCUMENTS

| | | | |
|---|---|---|---|
| 6,291,770 B1* | 9/2001 | Casperson | ............... H02G 3/00 174/139 |
| 6,483,200 B1* | 11/2002 | Jacobs | ..................... B60D 1/62 307/10.1 |
| 8,573,681 B2 | 11/2013 | Yamato et al. | |
| 8,653,365 B1* | 2/2014 | Mixon | .................... B60P 3/228 174/71 R |
| 2007/0221394 A1* | 9/2007 | Fondriest | ................ B64C 25/36 174/71 R |
| 2011/0030353 A1* | 2/2011 | Kamiya | ............. B01D 46/0063 60/297 |
| 2011/0147540 A1 | 6/2011 | Rivara et al. | |
| 2012/0223574 A1 | 9/2012 | Tanahashi et al. | |
| 2012/0330597 A1 | 12/2012 | Lammers | |
| 2013/0115036 A1* | 5/2013 | Yamato | ................. E02F 9/0858 414/687 |

FOREIGN PATENT DOCUMENTS

| | | | | |
|---|---|---|---|---|
| JP | 2007-63799 | * | 3/2007 | ............... E02F 9/20 |
| JP | 2012-056368 A | | 3/2012 | |
| WO | WO 2013/125063 A1 | | 8/2013 | |

\* cited by examiner

*Primary Examiner* — Levi Gannon

(57) ABSTRACT

Harness systems for a mining vehicle are disclosed. One system includes a first harness having a first plurality of wires coupled together and a first length. The system further comprises a second harness having a second plurality of wires coupled together and a second length, wherein at least one of the first plurality of wires is conductively coupled to at least one of the second plurality of wires. The second length spans a distance no greater than the first length. The second harness may be placed in a high risk area, which may be selected based upon at least one of one or more characteristics of the mining vehicle or a location of the high risk area within the mining vehicle.

14 Claims, 3 Drawing Sheets

HARNESS SYSTEM

TECHNICAL FIELD

This disclosure relates to wiring systems in vehicles, particularly to wire harnesses for mining vehicles.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Industrial vehicles such as mining vehicles often employ long, complicated wiring harnesses to communicate between components on the vehicle and with outside components. Wiring harnesses for mining vehicles generally are sized to fit a large portion of the vehicle, such as the left hand rear harness, chassis, etc. Such large harnesses require a plurality of connections. Also, one may encounter difficulty in replacing or servicing a large harness. Malfunctioning portions of the wire harness have been re-circuited or "jumped" due to difficulty in servicing the large wire harnesses. PCT Application Publication No. WO2013/125063A1 discloses "a routing structure of a wire harness continuously routed by being bent upward from both ends of a routing area under the floor of a vehicle body." (WO2013125063A1, Abstract.) Large wiring harnesses for vehicle systems remain prevalent in use.

SUMMARY

An embodiment of the present disclosure relates to a wiring system for a mining vehicle. The wiring system comprises a first harness having a first plurality of wires coupled together and a first length. The system further comprises a second harness having a second plurality of wires coupled together and a second length, wherein at least one of the first plurality of wires is conductively coupled to at least one of the second plurality of wires. The second length spans a distance no greater than the first length. The second harness is configured to be placed in a high risk area, wherein the high risk area is selected based upon at least one of one or more characteristics of the mining vehicle or a location of the high risk area within the mining vehicle. The second length spans a distance between an end of the second harness connectable to the first harness and at least one other end of the second harness connectable to at least one of another harness or a component of the mining vehicle.

Another embodiment of the present disclosure relates to a mining vehicle comprising a mining vehicle frame having at least one high risk area. The system further includes a first harness having a first plurality of wires coupled together and a first length; and a second harness having a second plurality of wires coupled together and a second length, wherein at least one of the first plurality of wires is conductively coupled to at least one of the second plurality of wires. The second length spans a distance less than the first length. The first harness and the second harness are configured to be coupled to the mining vehicle frame. Also, the second harness is configured to be placed in the high risk area, wherein the high risk area may be selected based upon at least one of one or more characteristics of the mining vehicle or a location of the high risk area within the mining vehicle. The second length spans a distance between an end of the second harness connectable to the first harness and at least one other end of the second harness connectable to at least one of another harness or a component of the mining vehicle.

Yet another embodiment of the present disclosure relates to a lining system for improved servicing. The lining system comprises a first line element having a first length and a first average cross-sectional area. The system also comprises a second line element having a second length and a second average cross-sectional area, wherein the first line element is coupled to the second line element. The second length spans a distance no greater than the first length, and the second line element is configured to be placed in an identified high risk area identified based upon characteristics of the location of the lining system with respect to a carrier. The second line element is configured to have greater accessibility for servicing based on a span of the second length.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

The disclosed wiring harness system includes wiring harnesses with varying parameters strategically connected and routed to different parts of a vehicle. The harnesses may be characterized as high risk and low risk based on a variety of factors related to the operation of the vehicle, the location of the harnesses with respect to the vehicle, and serviceability of the harness with respect to the vehicle. The high risk harnesses within the wiring harness system have different characteristics than the low risk harnesses. For example, the high risk harnesses may be any of the following as compared with low risk harnesses: shorter in length, smaller in diameter/cross-sectional area, higher in quality, and equipped with fewer connections, etc. A plurality of high risk harnesses may connect with other high risk harnesses and/or low risk harnesses. In one example, the wiring system may include a mining vehicle capable of having the wiring harnesses connected to the vehicle body. Wiring harness layouts may be designed to increase the assembly, modularity efficiency, and serviceability with parts. For example, a wiring harness may have a connection point at a shipping interface.

Figure 1:
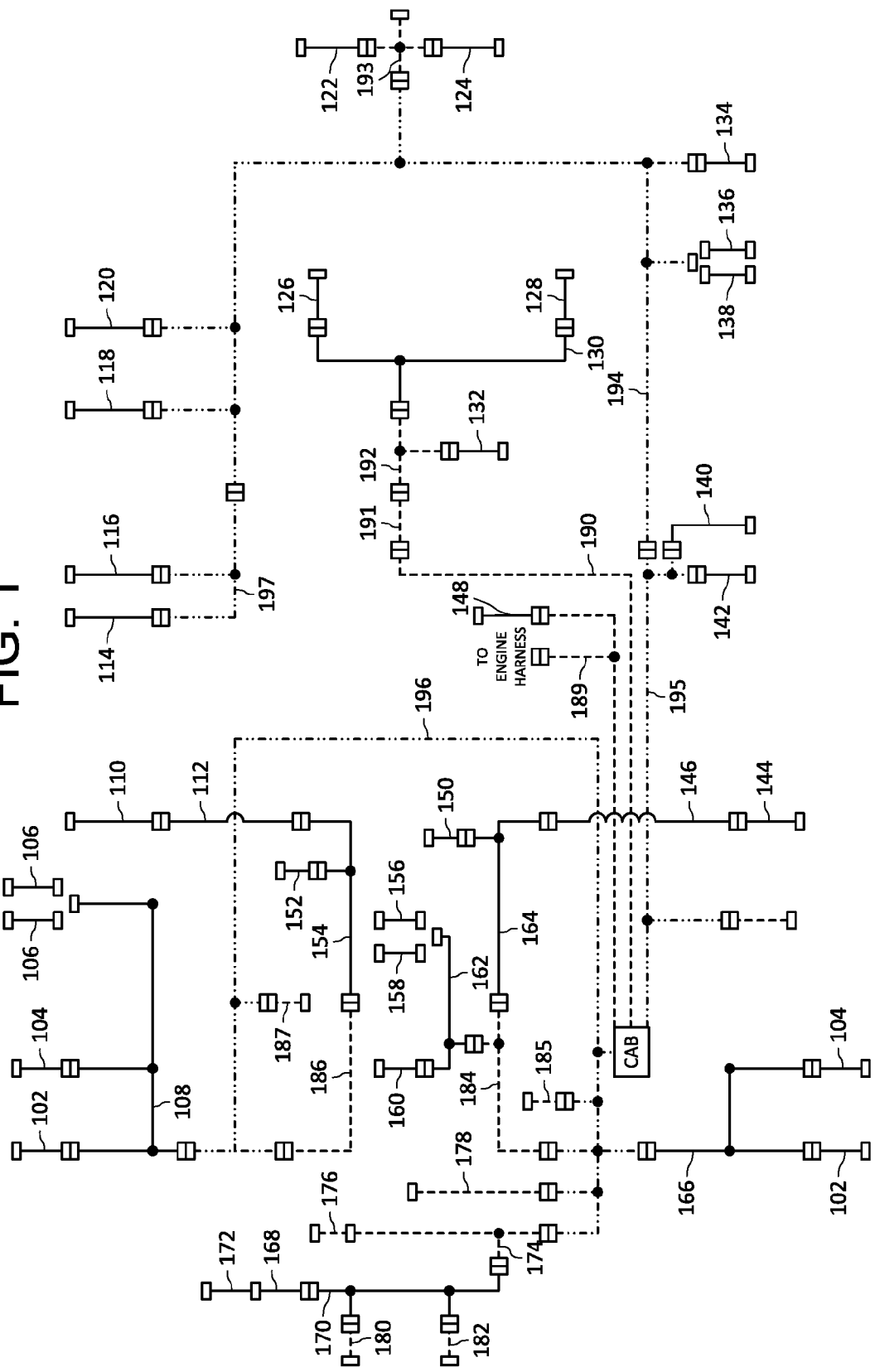
FIG. 1 is a schematic diagram of a wiring harness system, according to an exemplary embodiment.

Referring to FIG. 1, a schematic diagram of a wiring harness system according to an exemplary embodiment is shown. The system includes a plurality of harnesses strategically created and coupled together, and placed to create a harnessing system for a vehicle (e.g., a mining vehicle). The solid lines FIG. 1 represent high risk harnesses, the dashed lines represent low risk feeder harnesses, and the dotted/dashed lines represent low risk trunk harnesses. Generally, the low risk harnesses are longer in length than the high risk harness. For example, the rear chassis 194 harness extends much longer than rear brake oil temperature harness 120. The harnesses of FIG. 1 are placed in high risk areas (for example, near the exterior of the vehicle) and are shorter in length. Elements 102-172 of FIG. 1 represent exemplary high risk harnesses.

Harnesses for external vehicle equipment such as those related to the heated mirror 102, side work lamp 104, payload equipment 106, right hand body stop lamp 122, and left hand body stop lamp 124 are located in high risk areas on the vehicle in part due to the location near the exterior of the vehicle to provide feedback concerning machine operation to persons outside the vehicle. The payload equipment 106 may include payload lamps, which provide lighting with various colors (i.e., red and green), that indicate whether a vehicle needs more payload or has sufficient payload. The payload equipment 106 may also include a payload monitor, which is a digital scoreboard which shows a numerical value of the vehicle's current payload. Right hand body stop lamps 122 and left hand body stop lamps 124 are located on the body of the vehicle and may serve as brake lights. These features may also often be used frequently, thus increasing the likelihood and/or frequency of malfunction or damage. Shorter harnesses allow these vehicle components to be more easily serviced in the event of a malfunction. The platform of a vehicle may be a high risk area, thus the right hand platform 108 harness may be relatively short. Other exterior high risk area harnesses include the steering pump 114, left hand fender 166, PAS (powered access stairway) bumper 168, and vehicle bumper 170.

Areas relating to the wheels serve as a high risk area given the extensive and strenuous use of the wheels during operation of the vehicle. For example, harnesses for the external right hand front wheel speed sensor 110, internal right hand front wheel speed sensor 112, right hand rear wheel steering sensor 126, left hand rear wheel steering sensor 128, external left hand front wheel steering sensor 144, and internal left hand front wheel steering sensor 146 may each include shortened high risk harnesses in various exemplary embodiments. Other high risk harnesses relating to vehicle components may include, but are not limited to, the brake accumulator 134, brake valve 136, brake valve 138, brake filter and motor 140, rear brake oil temperature harness 120, and torque converter 148.

The hoist on a mining vehicle is used to raise and lower objects on a mining field and may be prone to malfunction. Thus, harnesses for the hoist raise solenoid 116 and hoist tank 118 may be considered high risk harnesses may be designed to have a shortened length. In some embodiments, harnesses for internal high risk areas of vehicles may include a rear axle housing 130, internal transmission 132 (for example, 6-speed), fuel tank 142, air start system 150, steering cylinder 152, and internal PAS 172. Further high risk area harnesses may also include a right hand lower casting harness 154, left hand lower casting harness 164, electric grease barrel harness 156, air grease barrel harness 158, service center keypad 160, and front outer frame 162.

FIG. 1 also includes a plurality of low risk harnesses. The low risk harnesses may be located in low risk areas that have a low likelihood of damage, malfunctioning, and maintenance. In some embodiments, the low risk areas may be located near the inner part of the vehicle, the upper part of the vehicle, or in areas of the vehicles that are used less often relative to high risk area components. A number of exemplary low risk feeder harnesses are listed as elements 174-193. Low risk harnesses for the vehicle components may include a front radiator 174, a PAS stairway 176, a rear radiator 178, a control box 180, a detect sensor system 182, left hand pedestal 184, the structural support tube 185, right hand pedestal 186, and steering tank 187. Additionally, the harness of the following units may also be located in an identified low risk area on a vehicle: the engine to cab 189 routed harness, transmission to cab 190, transmission jumper 191, transmission external 192, and tail casting 193. The wiring harness system may also include low risk trunk harnesses such as rear chassis (trunk) 194, left hand mid chassis 195, front chassis 196, and right hand mid chassis 197.

Figure 2:
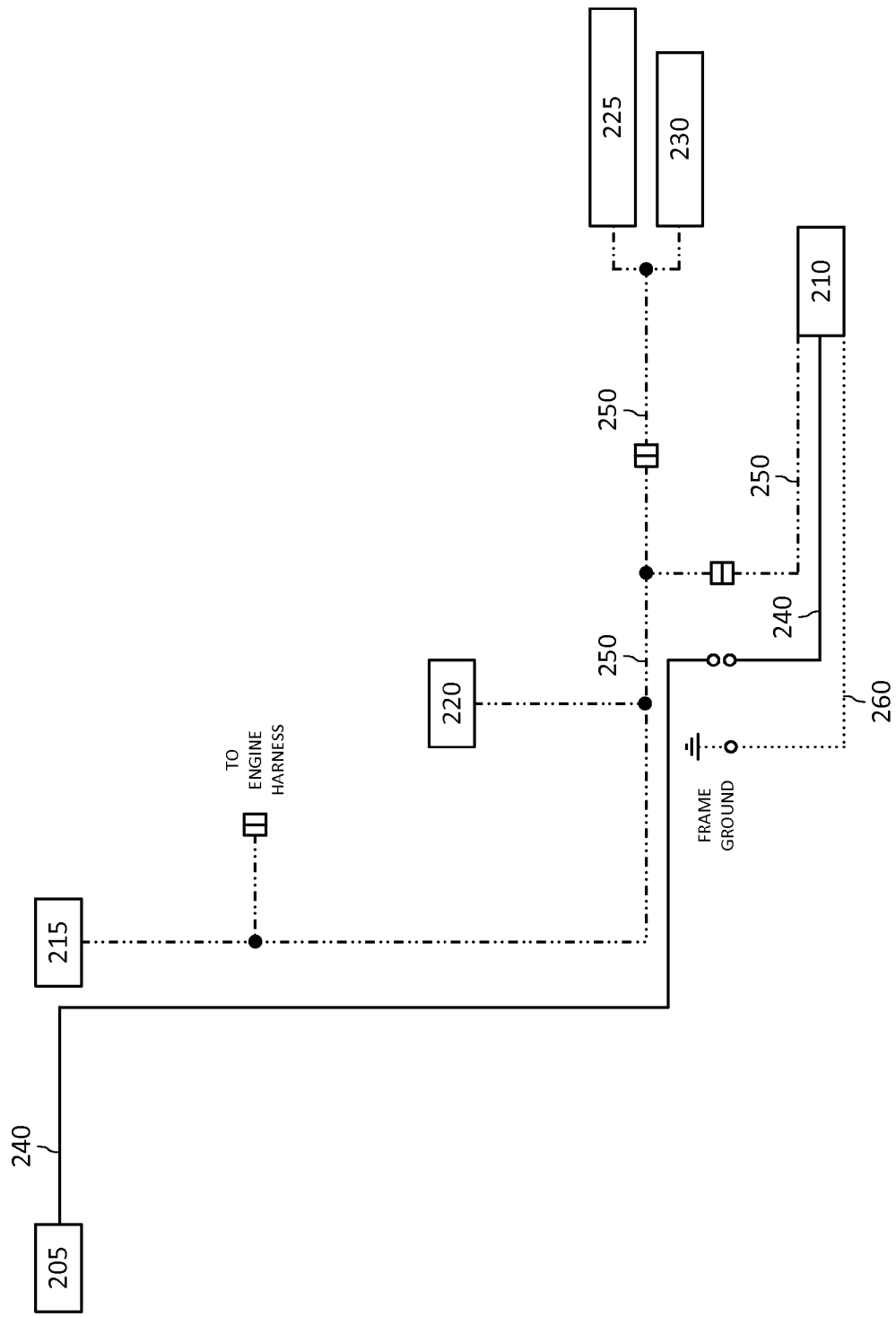
FIG. 2 is a schematic diagram of wiring harness system and power cable system on a mining vehicle, according to an exemplary embodiment.

FIG. 2 is a schematic diagram of a wiring harness system and power cable system on a mining vehicle, according to an exemplary embodiment. The wiring may include a power distribution box 205, a dosing cabinet 210, an aftertreatment unit 215, an electronic control module 220, a fuel priming pump solenoid 225, and a water-in-fuel sensor 230. The power distribution box 205 distributes power to various components of the vehicle. The aftertreatment unit 215 may be used to treat exhaust coming from an engine. The fuel priming pump solenoid 225 aids in facilitating the transfer of fuel to the engine of the vehicle. The water-in-fuel sensor 230 detects the amount of water in the fuel. Each of the components may be communicatively coupled through a variety of communication channels. The positive power cable 240, wiring harness 250, and negative power cable 260 are shown to aid in the transfer of signal, information, electricity, etc. Positive power cable 240 is connected to the power distribution box 205 and the dosing cabinet 210. The wiring harness 250 facilitates communication between several modules including the aftertreatment unit 215, the engine harness, the electronic control module 220, the fuel priming pump solenoid 225, the water-in-fuel sensor 230, and the dosing cabinet 210. The negative power cable 260 is connected to the dosing cabinet 210 as well as a grounded frame. In various embodiments, sections of a signal cabling system, the wire harness system, and the power cable system may be configured to be placed in high risk areas. For example, the section of the wiring harness attached to the fuel priming pump solenoid 225 may be a high risk section (e.g., short, fewer wires, higher grade) of the wiring harness placed in a high risk area.

Figure 3:
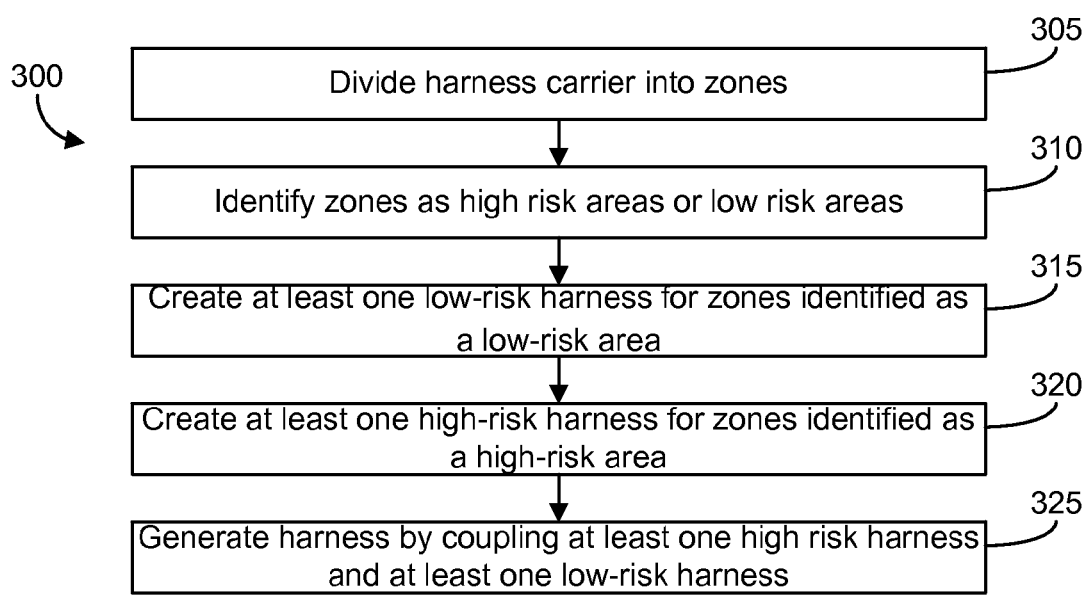
FIG. 3 is a flow chart of a method of creating a wiring harness according to an exemplary embodiment.

FIG. 3 shows a method 300 of creating a wiring harness system according to one example embodiment. The method includes dividing harness carrier (e.g., a frame and/or other components of a vehicle) into zones (305). The zones may be identified with respect to the location of a wiring body, such as a mining vehicle. Example zones may include top, bottom, rear, front, left hand side, right hand side, center, etc. In some embodiments, the zones may also be identified based on components within the vehicle, such as engine zone, bumper zone, lower chassis zone, control box zone, etc.

The method further includes identifying zones as high risk areas and/or low risk areas (310). A vehicle may have at least one high risk area and at least one low risk area. In some embodiments, a zone may be identified as high risk based upon a proximity to high risk areas, such as areas likely to encounter harsher force or exposure to elements (e.g., outside a mining truck frame rail, low on the mining truck, exposed to water cannons during cleaning) For example, the under belly of a vehicle is subject to force from debris hitting the surface as the vehicle travels, as well as effects of mud and/or water contacting the area of the vehicle. Such effects may cause wire harnesses in these areas to malfunction at a quicker rate than normal, thus the zone may be identified as a high risk area. In some embodiments, zones, or portions of zones, may be characterized as high risk areas based on the frequency, intensity, and use parameters of equipment found in the area. For example, certain lights or lamps on vehicles are very frequently used and, thus, the harnesses providing power and/or other signals to those components may be likely to wear out or malfunction. The discussion above provides further description with respect to exemplary types of equipment that may be found on a mining vehicle and characterizations of the type of harness used by the equipment. In some embodiments, zones located in areas that are less likely to encounter, for example, continuous, negative force, extended use, or exposure to elements, such as on top of a vehicle or inside the frame rails of a truck, may be identified as low risk areas. In some embodiments, a zone may contain high risk areas and low risk areas.

At least one low risk harness is created for zones identified as a low risk area (315). The low risk harness includes a plurality of wires coupled together and has a first length and a first cross-sectional area. The low risk harness may be long in length and may include a large number of connectors (e.g., a first plurality of connectors greater than a second plurality of connectors coupled to a high risk harness). According to one exemplary embodiment, a low risk harness within the wiring harness system may be sized to fit a large portion of the machine or full zones, such as the left hand rear harness or right hand front harness. In some embodiments, the low risk harnesses may be longer in length than one or more high risk harnesses (e.g., in terms of a longest lateral length from a first end of the harness to an opposite second end, a longest total length of wire, etc.), and/or may have a large number of connectors (e.g., 15 or more connectors). Also, the low risk harness may include material of a particular grade or quality (e.g., lower-grade material). Failing portions of any part of a low risk harness may result in replacement of the entire harness or installation of coping mechanisms, such as jumper wires. Thus, low risk harnesses may be placed in low risk areas where malfunction is least expected. The low risk harnesses may have a plurality of ends or terminals (e.g., modular terminals) connectable to other harnesses (either high risk or low risk), and/or equipment or components on a vehicle.

The method 300 also includes creating at least one high risk harness for zones identified as a high risk area (320). The at least one high risk harness may include a plurality of wires coupled together and may have a second length. According to one exemplary embodiment, the second length may be shorter than the length of at least one low risk harness. In one exemplary embodiment, the length of a high risk harness spans a distance of five feet or less. In another exemplary embodiment, the second length of at least one high risk harness may be equal in length to at least one low risk harness. In some embodiments, the high risk harness may have fewer connectors than one or more low risk harnesses (e.g., the high risk harness may be designed to feed fewer vehicle components). For example, the high risk harness may have 4 or less connectors. The shorter length of the high risk harness may provide greater accessibility for servicing the mining vehicle. For example, a shorter harness may be easier to service and may take less time to service. In some embodiments, the high risk harness may have a second cross-sectional area (e.g., an average cross-sectional area across the harness, a largest cross-sectional area, etc.) that is smaller than the cross-sectional area of the low risk harness. In some embodiments, the high risk harnesses may be constructed from a higher grade or quality of material than the low risk harnesses. The higher grade (e.g., a first grade) material may last longer than lower grade (e.g., second grade) material in the high risk areas. The high risk harnesses may also have a plurality of ends or terminals connectable to other harnesses (either high risk or low risk), and/or equipment or components on a vehicle.

According to an exemplary embodiment, high risk harnesses and low risk harnesses may be differentiated by cross-sectional area, length, grade of the material from which the harness or a portion thereof is constructed, and/or other characteristics. In some embodiments, a high risk harness may have a smaller cross-sectional area than a low risk harness. In some exemplary embodiments, high risk harnesses may have an average cross-sectional area below 75 mm$^2$. The cross-sectional area may be smaller, for example, due to having a fewer amount of wires coupled together. In another example, the cross-sectional area may be small due to using a thinner or smaller wire (i.e., a wire with a smaller diameter). In various exemplary embodiments, low risk harnesses may use a greater number of wires coupled together and/or may have a cross-sectional area greater than 75 mm$^2$. In some embodiments, high risk harnesses may additionally or alternatively have a smaller length (for example, sum of length of all wires less than 20 feet), while low risk harnesses may have a longer length (for example, sum of length of all wires greater than 20 feet). In some embodiments, high risk harnesses may additionally or alternatively be constructed of a higher grade and/or more durable material than low risk harnesses. For example, higher grade and/or durability features may include military/aerospace style material, the use of metal connectors, the use of heat-shrinking and potting, full jacketing of wires and connectors, etc. Military/aerospace style material (wires, jackets, connects, etc.) meet military and aerospace specifications and are created to withstand harsh environments. Heat-shrinking involves applying an extended plastic tube which shrinks when heated. The plastic tube generally shrinks in one plane, such as the diameter. Heat-shrinking may be used to meet a variety of demands from the environment. Heat-shrinking may also be used to repair wires, bundle wires, create seals, protect the wires, etc. Potting involves a process of filling electrical assemblies with a material to prevent corrosion and moisture damage and/or to provide resistance to forces (e.g., vibrations). A jacket is a covering over the wire that protects the wire from environmental elements. In some embodiments, low risk harnesses may be of a lower grade, have plastic connectors, not have heat-shrink or potting, use nylon weaving over wires, not have the back of the connectors protected, etc.

The wiring harness system may be generated by coupling at least one high risk harness and at least one low risk harness (325). The high risk harness and the low risk harness may be coupled together by conductively coupling at least one of the plurality of wires within each harness. The coupling of the wires may be accomplished using any method known in the art. In some embodiments, a plurality of high risk harnesses and low risk harnesses may be used and coupled together. For example, a high risk harness may be connected to another high risk harness at one end, and at another end, the high risk harness may be coupled to a low risk harness. Likewise, a low risk harness may be connected to another low risk harness at one end, and at another end, the low risk harness may be connected to a high risk harness.

The coupling of the low risk and high risk harnesses within the wiring system may depend on the location of the low risk areas and high risk areas. It should be understood that the pattern of coupled high risk harnesses and low risk harnesses may vary. In one example, at least one additional high risk harness (e.g., a third harness having a third plurality of wires of a third length and a third average cross-sectional area) may be used in the wiring system and may have at least one of a shorter length, a substantially equal or smaller cross-sectional area, fewer connectors, and/or a higher grade material than at least one harness to which the additional high risk harness is connected. The additional high risk harness may also be connectable to another harness within the wiring harness system or a component of the body to which the wiring harness system is attached (e.g., a mining vehicle).

The above methods and systems may also by applied to other types of lining systems, such as tubing for carrying fluids (e.g., oil, water, etc.) and piping elements (e.g., a metal piping element) capable of receiving a flow of material. The lining may be categorized based on identified risk of areas (e.g., identified low risk areas and identified high risk areas) in which the lining will be placed, and the lining may have varying characteristics based on whether the lining will be placed in a high risk area or low risk area. High risk lining may be shorter in length and/or higher in quality (i.e., a first quality) whereas the low risk lining may be longer in length and lower in quality (i.e., a second quality). A plurality of additional line elements or a plurality of additional harnesses may be added to any lining system or harness system.

The construction and arrangement of the wiring harness system for mining vehicles as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, connection arrangements, use of materials, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

INDUSTRIAL APPLICABILITY

The disclosed systems and apparatus may be implemented to facilitate easier repair in wiring systems, particularly wire harnesses on large vehicles such as heavy mining vehicles. The wiring system may target high risk areas based one or more of a number of factors, including a wire harnesses susceptibility to failure, and may place shorter segments of wire harnessing in those areas. The ability to have high-quality, reliable harnesses installed in strategic areas not only reduces the number of wiring harness failures, but it also significantly reduces the amount of time and material used in repairing failed wire harnesses. Industrial impacts from the present disclosure may ultimately result in higher customer satisfaction by saving the customer both time and money in increasing the uptime of the vehicle along with serviceability of the vehicle.

It will be apparent to those skilled in the art that various modifications and variations can be made to the disclosed wiring harness system. Other embodiments will be apparent to those skilled in the art from consideration of the specification and practice of the disclosed wiring harness system. It is intended that the specification and examples be considered as exemplary only, with a true scope being indicated by the following claims and their equivalents.

What is claimed is:

1. A wiring system for a mining vehicle comprising:
a first harness having a first plurality of wires coupled together and a first length;
a second harness having a second plurality of wires coupled together and a second length, wherein at least one of the first plurality of wires is conductively coupled to at least one of the second plurality of wires, the second length spanning a distance no greater than the first length; and
a third harness having a third plurality of wires coupled together, the third harness having a third length shorter than the second length,
wherein the second harness is configured to be placed in a high risk area, the high risk area selected based upon at least one of one or more characteristics of the mining vehicle or a location of the high risk area within the mining vehicle,
wherein the second length spans a distance between an end of the second harness connectable to the first harness and at least one other end of the second harness connectable to at least one of another harness or a component of the mining vehicle, and
wherein the third harness is configured to couple to at least one of the first harness, the second harness, and the component of the mining vehicle.

2. The wiring system of claim 1, wherein the first harness is of a first grade and the second harness is of a second grade, the first grade being lower than the second grade.

3. The wiring system of claim 1, wherein the first harness further comprises a first average cross-sectional area and the second harness further comprises a second average cross-sectional area, the second average cross-sectional area being smaller than the first average cross-sectional area.

4. The wiring system of claim 3, wherein the third harness comprises a third average cross-sectional area, the third average cross-sectional area being one of substantially equal or smaller than the second average cross-sectional area.

5. The wiring system of claim 4, wherein the first harness is of a first grade, the second harness is of a second grade, and the third harness is of the second grade, the first grade being lower than the second grade.

6. The wiring system of claim 1, wherein the second harness is configured to have greater accessibility for servicing the mining vehicle based on a span of the second length.

7. The wiring system of claim 1, wherein the second length spans a distance of five feet or less.

8. The wiring system of claim 1, the first harness further comprising a first plurality of connectors configured to couple the first plurality of wires within the first harness to other wires, and the second harness comprising a second plurality of connectors configured to couple the second plurality of wires within the second harness to other wires, wherein the second plurality of connectors is less than the first plurality of connectors.

9. The wiring system of claim 8, wherein the second harness comprises 4 or less connectors.

10. A mining vehicle comprising:
a mining vehicle frame having at least one high risk area;
a first harness having a first plurality of wires coupled together and a first length; and
a second harness having a second plurality of wires coupled together and a second length, wherein at least one of the first plurality of wires is conductively coupled to at least one of the second plurality of wires, the second length spanning a distance less than the first length,
wherein the first harness and the second harness is configured to be coupled to the mining vehicle frame,
wherein the second harness is configured to be placed in a high risk area, the high risk area selected based upon at least one of one or more characteristics of the mining vehicle or a location of the high risk area within the mining vehicle,
wherein the second length spans a distance between an end of the second harness connectable to the first harness and at least one other end of the second harness connectable to at least one of another harness or a component of the mining vehicle, and
wherein the first harness further comprises a first plurality of connectors configured to couple the first plurality of wires within the first harness to other wires, and the second harness comprises a second plurality of connectors configured to couple the second plurality of wires within the second harness to other wires, wherein the second plurality of connectors is less than the first plurality of connectors.

11. The mining vehicle of claim 10, wherein the second length spans a distance of five feet or less and the second harness comprises 4 or less connectors.

12. The mining vehicle of claim 10, wherein the first harness further comprises a first average cross-sectional area and the second harness further comprises a second average cross-sectional area, the second average cross-sectional area being smaller than the first average cross-sectional area.

13. The mining vehicle of claim 10, wherein the first harness is of a first grade and the second harness is of a second grade, the first grade being lower than the second grade.

14. The mining vehicle of claim 10, the mining vehicle further comprising at least one low risk area, in which at least one of a plurality of additional harnesses is configured to be placed, at least one of the plurality of additional harnesses further configured to be placed in the at least one high risk area, wherein the at least one of the plurality of additional harnesses configured to be placed in the at least one high risk area is shorter in length and higher in quality than the at least one of the plurality of additional harnesses configured to be placed in the at least one low risk area.

\* \* \* \* \*